(12) United States Patent
Chang et al.

(10) Patent No.: US 10,318,784 B2
(45) Date of Patent: Jun. 11, 2019

(54) TOUCH PANEL-SENSING CHIP PACKAGE MODULE COMPLEX AND A MANUFACTURING METHOD THEREOF

(71) Applicant: XINTEC INC., Taoyuan (TW)

(72) Inventors: Shu-Ming Chang, New Taipei (TW); Tsang-Yu Liu, Zhubei (TW); Yen-Shih Ho, Kaohsiung (TW)

(73) Assignee: XINTEC INC., Taoyuan (TW)

( * ) Notice: Subject to any disclaimer, the term of this patent is extended or adjusted under 35 U.S.C. 154(b) by 148 days.

(21) Appl. No.: 15/177,143

(22) Filed: Jun. 8, 2016

(65) Prior Publication Data

US 2016/0379040 A1 Dec. 29, 2016

Related U.S. Application Data

(60) Provisional application No. 62/186,327, filed on Jun. 29, 2015.

(51) Int. Cl.
*G06K 9/00* (2006.01)
*G06F 3/041* (2006.01)

(52) U.S. Cl.
CPC ......... *G06K 9/00013* (2013.01); *G06F 3/041* (2013.01); *G06F 2203/0338* (2013.01); *G06F 2203/04103* (2013.01); *G06K 9/00053* (2013.01)

(58) Field of Classification Search
CPC ........... G06K 9/00053; G06K 9/00013; G06K 9/0002; G06K 9/00033; G06K 9/0004; G06F 3/041; G06F 2203/04103; G06F 2203/00; G06F 3/0412; G06F 3/0447; G06F 3/045; G06F 3/03; G06F 3/00; G06F 2203/0338; G06F 2203/038

See application file for complete search history.

(56) References Cited

U.S. PATENT DOCUMENTS

| | | | |
|---|---|---|---|
| 2013/0307818 A1* | 11/2013 | Pope | G06F 3/044 345/174 |
| 2015/0146944 A1* | 5/2015 | Pi | H04L 63/0861 382/124 |
| 2017/0147850 A1* | 5/2017 | Liu | G06K 9/0002 |
| 2017/0344788 A1* | 11/2017 | Lee | G06F 3/0412 |
| 2017/0372115 A1* | 12/2017 | Lee | G06K 9/00006 |
| 2018/0039815 A1* | 2/2018 | Jung | G06K 9/00013 |

FOREIGN PATENT DOCUMENTS

| | | |
|---|---|---|
| CN | 1723567 | 1/2006 |
| CN | 103425965 | 12/2013 |
| WO | 2015077733 | 5/2015 |

* cited by examiner

*Primary Examiner* — Julie Anne Watko
(74) *Attorney, Agent, or Firm* — Liu & Liu (57) ABSTRACT

This invention provides a touch panel-sensing chip package module complex, comprising: a touch panel with a first top surface and a first bottom surface opposite to each other, wherein the first bottom surface having a first cavity with a bottom wall surrounded by a sidewall; a color layer formed on the bottom wall and the first bottom surface adjacent to the cavity; and a chip scale sensing chip package module bonded to the cavity by the color layer formed on the bottom wall of the cavity.

16 Claims, 6 Drawing Sheets

TOUCH PANEL-SENSING CHIP PACKAGE MODULE COMPLEX AND A MANUFACTURING METHOD THEREOF

This application claims the benefit of U.S. provisional application No. 62/186,327, filed on Jun. 29, 2015, and the entirety of which is incorporated by reference herein.

BACKGROUND OF THE INVENTION

Field of the Invention

The present invention relates to a touch panel-sensing chip package module complex and a manufacturing method thereof.

Description of the Related Art

A conventional chip package having sensing function is easily contaminated or damaged during the manufacturing processes which results in decreasing both the yield and liability of conventional chip package having sensing functions. In order to meet the tendency of size-miniaturization of electronic components, it is an import subject to minimize the thickness of a substrate for carrying a semiconductor chip to be packaged. The circuit is formed on a thin chip layer during the manufacturing process of a package substrate. However, if a thin substrate for carrying a semiconductor chip to be packaged is utilized, the yield will be reduced owing to the thin substrate is bended or damaged during the package process.

Moreover, the touch panel or the panel having sensing functions, for example biometric identification, are current trends of technology. However, the touch devices are easily out of orders owing to frequently pressing onto the panel by users. In order to resolve abovementioned defects, a scratch-resistance material having a hardness higher than 9, for example sapphire, is selected as the touch pad of the touch panel to protect the semiconductor devices under the touch panel.

Accordingly, this invention provides a novel touch panel-sensing chip package module complex and a manufacturing method thereof which is characterized by joining the sensing chip package module together with a touch panel to reduce the production cost and enhance the efficiency thereof.

SUMMARY OF THE INVENTION

A feature of this invention provides a touch panel-sensing chip package module complex, comprising: a touch panel with a first top surface and a first bottom surface opposite to each other, wherein the first bottom surface has a cavity with a bottom wall surrounded by a sidewall; a color layer formed on the bottom wall and the first bottom surface adjacent to the cavity; and a chip scale sensing chip package module placed in the cavity by bonded to the color layer formed on the bottom wall, wherein the chip scale sensing chip package module comprises: a chip scale sensing chip package, comprising: a sensing chip with a second top surface and a second bottom surface opposite to each other, and the chip scale sensing chip comprising a sensing device and a plurality of conductive pads formed near the second top surface, and a conductive structure formed near the second bottom surface electrically connected to the conductive pads by a re-distribution layer; and a cap layer overlay on the second top surface of the sensing chip; and a circuit board formed under the chip scale sensing chip package and electrically connected to the chip scale sensing chip package by the conductive structure.

Another feature of the invention provides a touch panel-sensing chip package module complex mentioned above, wherein the sensing device is a biometric identification device.

Another feature of the invention provides a touch panel-sensing chip package module complex as mentioned above, wherein the biometric identification device comprises a fingerprint identification device.

Another feature of the invention provides a touch panel-sensing chip package module complex as mentioned above, wherein the conductive structure comprises solder balls, solder bumps or conductive pillars.

Another feature of the invention provides a touch panel-sensing chip package module complex as mentioned above, wherein the circuit board is a rigid-flexible print circuit board.

Another feature of the invention provides a touch panel-sensing chip package module complex as mentioned above, wherein the circuit board further comprises a connector.

Another feature of the invention provides a touch panel-sensing chip package module complex as mentioned above, further comprising an adhesive layer sandwiched between the color layer and the chip scale sensing chip package module.

Another feature of this invention provide a method of manufacturing a touch panel-sensing chip package module complex, comprising the steps of: providing a touch panel with a first top surface and a first bottom surface opposite to each other, wherein the first bottom surface has a plurality of cavities, and each cavity has a bottom wall surrounded by a sidewall; forming a color layer on the bottom wall of each cavity and the first bottom surface adjacent to each cavity; and providing a plurality of chip scale sensing chip package modules, and placing each of the chip scale sensing chip package modules in each cavity by bonding each of the chip scale sensing chip package modules to the color layer formed on the bottom wall, wherein each of the chip scale sensing chip package modules comprises: a chip scale sensing chip package, comprising: a sensing chip with a second top surface and a second bottom surface opposite to each other, and the chip scale sensing chip comprising a sensing device and a plurality of conductive pads formed near the second top surface, and a conductive structure formed near the second bottom surface electrically connected to the conductive pads by a re-distribution layer; and a cap layer overlay on the second top surface of the sensing chip; and a circuit board formed under the chip scale sensing chip package and electrically connected to the chip scale sensing chip package by the conductive structure; and applying a scribing process along scribing channels between adjacent cavities to generate a plurality of independent touch panel-sensing chip package module complexes.

Another feature of this invention provides a method of manufacturing a touch panel-sensing chip package module complex as mention above, wherein the sensing device is a biometric identification device.

Another feature of this invention provides a method of manufacturing a touch panel-sensing chip package module complex as mention above, wherein the biometric identification device comprises a fingerprint identification device.

Another feature of this invention provides a method of manufacturing a touch panel-sensing chip package module complex as mention above, wherein the conductive structure comprises solder balls, solder bumps or conductive pillars.

Another feature of this invention provides a method of manufacturing a touch panel-sensing chip package module complex as mention above, wherein the circuit board is a rigid-flexible print circuit board.

Another feature of this invention provides a method of manufacturing a touch panel-sensing chip package module complex as mention above, wherein the rigid-flexible print circuit board further comprises a connector.

Another feature of this invention provides a method of manufacturing a touch panel-sensing chip package module complex as mention above, further comprising a step of forming an adhesive layer sandwiched between the color layer and the chip scale sensing chip package module.

Another feature of this invention provides another touch panel-sensing chip package module complex, comprising: a touch panel with a first top surface and a first bottom surface opposite to each other, wherein the first top surface having a first cavity with a bottom wall surrounded by a sidewall and the first bottom surface having a second cavity, and the cross-sectional area of the first cavity is greater than that of the second cavity, whereby the first cavity and the second cavity are passed through by an opening; a first color layer formed on the first bottom surface adjacent to the second cavity; a touch substrate with a third top surface and a third bottom surface with a second color layer formed thereon opposite to each other, whereby the touch substrate is bonded to the bottom wall of the first cavity by part of the second color layer; and a chip scale sensing chip package module placed in the second cavity by bonding to the third surface of the touch substrate by sandwiching the second color layer exposed by the opening therebetween, whereby the chip scale sensing chip package module comprises: a chip scale sensing chip package, comprising: a sensing chip with a second top surface and a second bottom surface opposite to each other, and the chip scale sensing chip comprising a sensing device and a plurality of conductive pads formed near the second top surface, and a conductive structure formed near the second bottom surface electrically connected to the conductive pads by a re-distribution layer; and a cap layer overlay on the second top surface of the sensing chip; and a circuit board formed under the chip scale sensing chip package and electrically connected to the chip scale sensing chip package by the conductive structure.

Another feature of this invention provides a touch panel-sensing chip package module complex as mentioned above, wherein the sensing device is a biometric identification device.

Another feature of this invention provides a touch panel-sensing chip package module complex as mentioned above, wherein the biometric identification device comprises a fingerprint identification device.

Another feature of this invention provides a touch panel-sensing chip package module complex as mentioned above, wherein the conductive structure comprises solder balls, solder bumps or conductive pillars.

Another feature of this invention provides a touch panel-sensing chip package module complex as mentioned above, wherein the circuit board is a rigid-flexible print circuit board.

Another feature of this invention provides a touch panel-sensing chip package module complex as mentioned above, wherein the rigid-flexible print circuit board further comprises a connector.

Another feature of this invention provides a touch panel-sensing chip package module complex as mentioned above, further comprising a metal holding ring surrounding between the edge of the cap layer and the sidewall of the first cavity.

Another feature of this invention provides a touch panel-sensing chip package module complex as mentioned above, further comprising a protective substrate capped on the first top surface of the touch panel and the third top surface of the touch substrate.

Another feature of this invention provides a touch panel-sensing chip package module complex as mentioned above, further comprising an adhesive layer sandwiched between the second color layer and the chip scale sensing chip package module.

Another feature of this invention provides a method of manufacturing a method of manufacturing a touch panel-sensing chip package module complex, comprising the steps of: providing a touch panel with a first top surface and a first bottom surface opposite to each other, wherein the first top surface has a plurality of first cavities, and each of the first cavities has a bottom wall surrounded by a sidewall, and the first bottom surface has a plurality of second cavities, whereby the cross-sectional area of each of the first cavities is greater than that of each of the second cavities, and each of the first cavities and each of the second cavities are connected and passed through by an opening; forming a first color layer on the first bottom surface adjacent to the second cavities; providing a plurality of touch substrates, whereby each of the touch substrates comprises a third top surface and a third bottom surface with a second color layer formed thereon opposite to each other, and each of the touch substrates is bonded to the bottom wall of each of the first cavities by part of the second color layer; providing a plurality of chip scale sensing chip package modules, and placing each of the chip scale sensing chip package modules in each of the second cavities by bonding to the third surface of each touch substrate by sandwiching the second color layer exposed by the opening therebetween, wherein each of the chip scale sensing chip package modules comprises: a chip scale sensing chip package, comprising: a sensing chip with a second top surface and a second bottom surface opposite to each other, and the chip scale sensing chip comprising a sensing device and a plurality of conductive pads formed near the second top surface, and a conductive structure formed near the second bottom surface electrically connected to the conductive pads by a re-distribution layer; and a cap layer overlay on the second top surface of the sensing chip; and a circuit board formed under the chip scale sensing chip package and electrically connected to the chip scale sensing chip package by the conductive structure; and applying a scribing process along scribing channels between the first cavities adjacent to each other to generate a plurality of independent touch panel-sensing chip package module complexes.

Another feature of this invention provides a method of manufacturing a touch panel-sensing chip package module complex as mention above, wherein the sensing device is a biometric identification device.

Another feature of this invention provides a method of manufacturing a touch panel-sensing chip package module complex as mention above, wherein the biometric identification device comprises a fingerprint identification device.

Another feature of this invention provides a method of manufacturing a touch panel-sensing chip package module complex as mention above, wherein the conductive structure comprises solder balls, solder bumps or conductive pillars.

Another feature of this invention provides a method of manufacturing a touch panel-sensing chip package module complex as mention above, wherein the circuit board is a rigid-flexible print circuit board.

Another feature of this invention provides a method of manufacturing a touch panel-sensing chip package module complex as mention above, wherein the rigid-flexible print circuit board further comprises a connector.

Another feature of this invention provides a method of manufacturing a touch panel-sensing chip package module complex as mention above, further comprising a metal holding ring surrounding between the edge of the cap layer and the sidewall of the first cavity.

Another feature of this invention provides a method of manufacturing a touch panel-sensing chip package module complex as mention above, further comprising a step of forming a protective substrate on the first top surface of the touch panel and the third top surface of the touch substrate before or after the scribing process.

Another feature of this invention provides a method of manufacturing a touch panel-sensing chip package module complex as mention above, further comprising a step of forming an adhesive layer sandwiched between the second color layer and the chip scale sensing chip package module.

DETAILED DESCRIPTION OF THE INVENTION

The making and using of the embodiments of the present disclosure are discussed in detail below. However, it should be noted that the embodiments provide many applicable inventive concepts that can be embodied in a variety of specific methods. The specific exemplary embodiments discussed are merely illustrative of specific methods to make and use the embodiments, and do not limit the scope of the disclosure.

Exemplary Embodiment 1

A detailed description of the touch panel-sensing chip package module complex and a method of manufacturing the same according to embodiment 1 of this invention is given below with reference to the accompany FIGS. 1A~1C and FIG. 3.

Figure 1A:
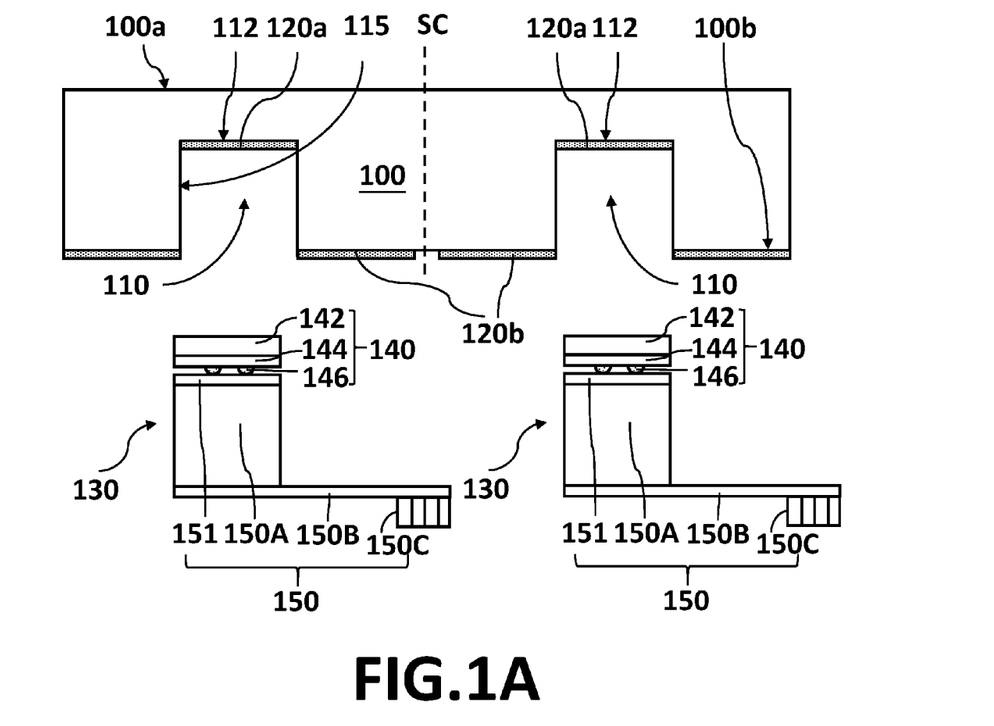
FIGS. 1A~1C are cross-sectional views of the exemplary embodiment 1 of a method of manufacturing a touch panel-sensing chip package module complex according to this present invention.

First, please refer to FIG. 1A. A touch panel 100 with a first top surface 100a and a first bottom surface opposite to each other is provided, wherein the first top surface 100a having a plurality of cavities 110 spaced with each other, and each cavity 110 has a bottom wall 112 surrounded by a sidewall 115.

Then, a color layer 120a is formed on the bottom wall 112 of each cavity 110, and a color layer 120b is formed on the first bottom surface 100b adjacent to each cavity 110.

Figure 1B:
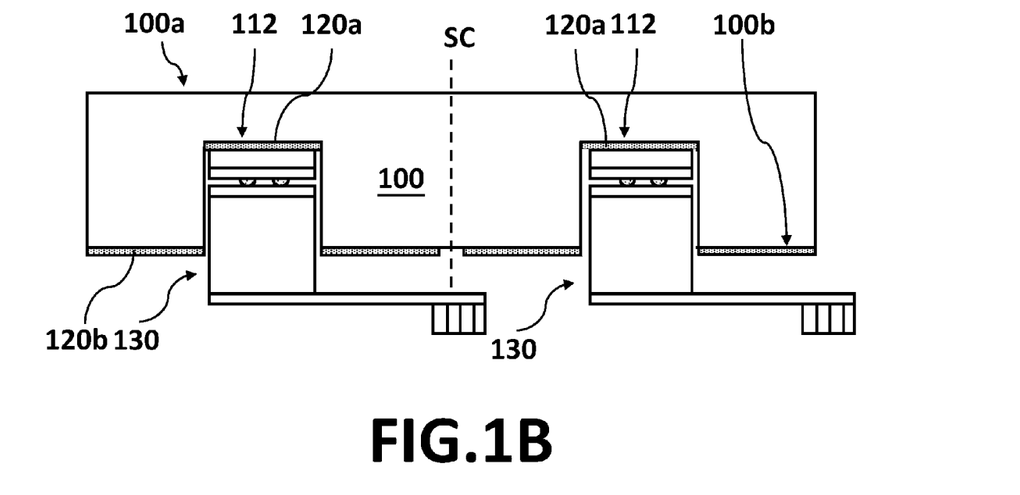

Next, please refer to FIG. 1B. A plurality of chip scale sensing chips package modules 130 are provided. Each chip scale sensing chips package module 130 is placed in each cavity 110 by bonding to the color layer 120a on the bottom wall 112. Each chip scale sensing chip package module 130 comprises a chip scale sensing chip package 140 electrically connected to a rigid-flexible print circuit board 150, wherein detailed structure of the chip scale sensing chip package 140 is illustrated in FIG. 3.

Figure 3:
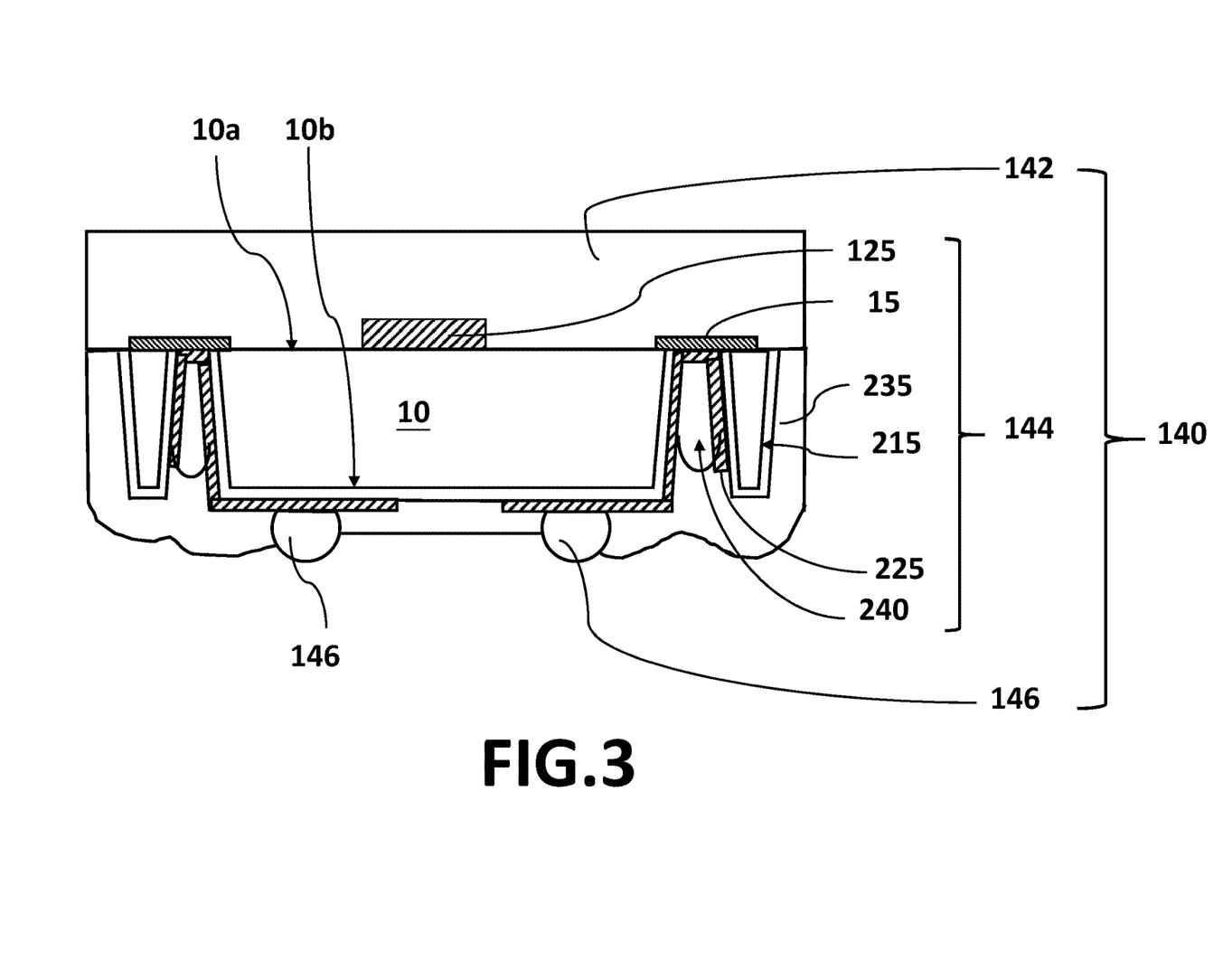
FIG. 3 is a touch panel-sensing chip package module complex applied to embodiments 1 and 2 according to this present invention.

As illustrated in FIG. 3, each chip scale sensing package 140 comprises a sensing chip 144 and a cap layer 142 capped on the sensing chip 144. The cap layer 142 is consisted of a material with higher hardness, such as glass, aluminum nitride, zirconia or sapphire. The sensing chip 144 comprises a substrate 10 with a top surface 10a and a bottom surface 10b, and a sensing device 125 and a plurality of conductive pads formed near the top surface 10a, and a conductive structure 146 formed near the bottom surface 10b electrically connected to the conductive pads 15 by a re-distribution layer 225 is isolated by an insulating layer 215. The re-distribution layer 225, part of the insulating layer 215 and part of the conductive structure 146 are overlay by a passivation layer (such as solder mask) 235. The sensing chip 144 can be selected from a group of a biometric identification chip, an environmental factors sensing chip and a touch sensing chip. The sensing chip 144 of this embodiment is a fingerprint identification chip. Moreover, the conductive structure 146 mentioned above comprises solder balls, and/or solder bumps and/or conductive pillars.

The circuit board 150 of this embodiment is a rigid-flexible print circuit board, comprising a rigid board 150A with a circuit layer 151 and a flexible board 150B, wherein one end of the flexible board 150B is connected to the rigid layer 150A, and another end of the flexible board 150B is a connector 150C used to electrically connected with other electric devices. The chip scale sensing chip package 140 is electrically connected to the rigid-flexible circuit board 150 by bonding the conductive structure 146 to the circuit layer 151 of the rigid board 150A.

Figure 1C:
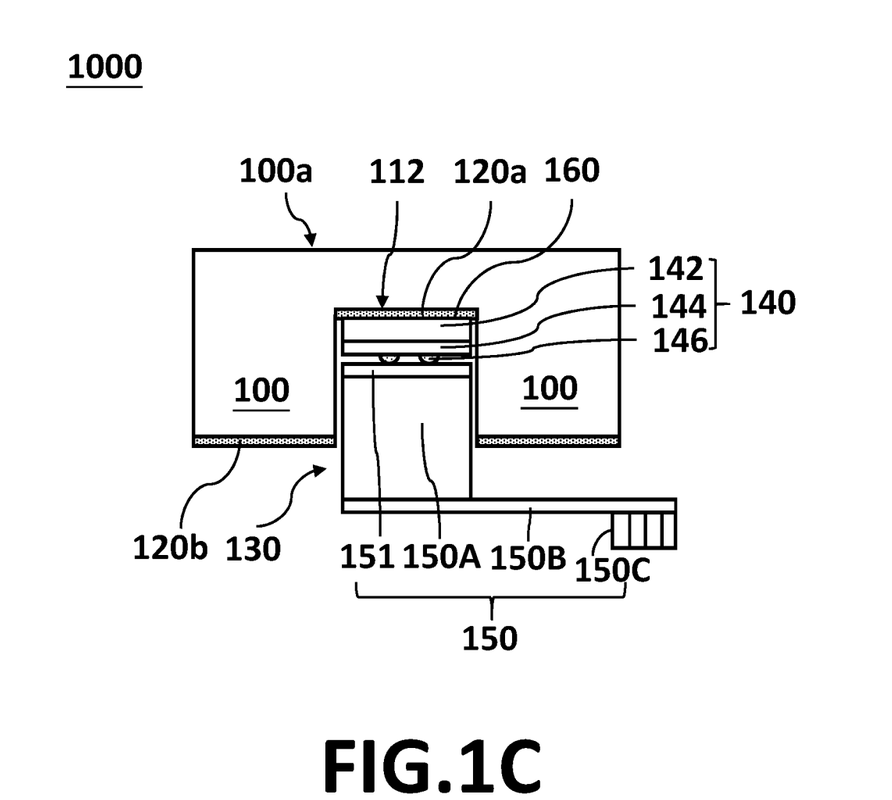

Finally, the touch panel 100 is scribed along the scribing channels (SC) between the adjacent cavities 110 to generate a plurality of independent touch panel-sensing chip package module complexes 1000 as illustrated in FIG. 1C.

According to other embodiments of this invention, an adhesive layer (not shown) can be sandwiched between the color layer 120a and the chip scale sensing chip package module 130 to enhance the adhesion between color layer 120a and the chip scale sensing chip package module 130.

Exemplary Embodiment 2

A detailed description of the touch panel-sensing chip package module complex and a method of manufacturing the same according to embodiment 2 of this invention is given below with reference to the accompany FIGS. 2A~2F.

Figure 2A:
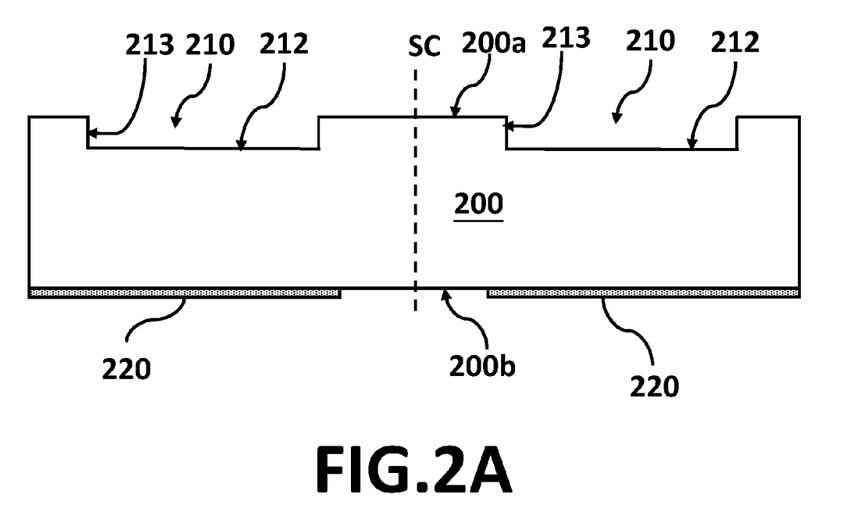
FIGS. 2A~2F are cross-sectional views of the exemplary embodiment 2 of a method of manufacturing a touch panel-sensing chip package module complex according to this present invention.

First, please refer to FIG. 2A. A touch panel 200 with a first top surface 200a and a first bottom surface 200b opposite to each other is provided, wherein the first top surface 200a having a plurality of first cavities 210 spaced to each other, and each first cavity 210 has a bottom wall 212 surrounded by a sidewall 213. Then, a first color layer 220 is formed on the bottom surface 200b adjacent to each cavity 210.

Figure 2B:
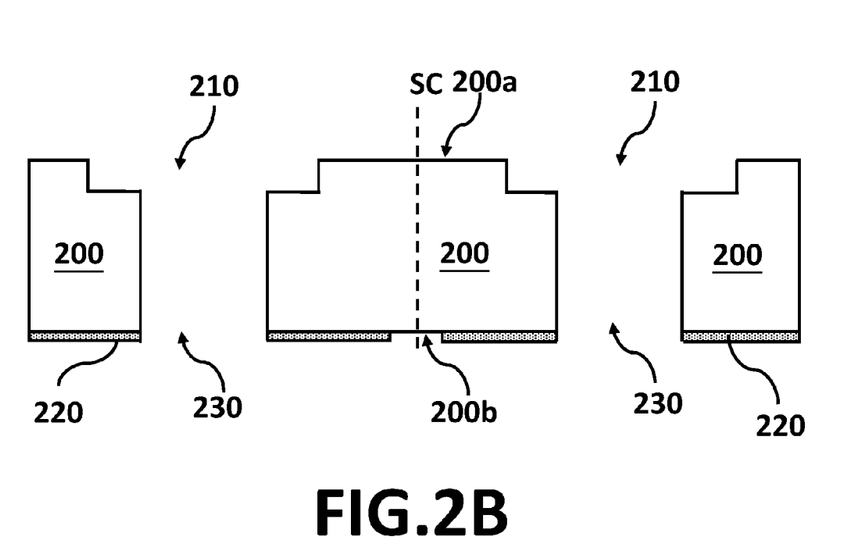

Next, please refer to FIG. 2B. A plurality of second cavities 230 are formed on the bottom surface 200b by removing part of the touch panel 200 and part of the color layer 220 by means of etching, polishing or milling, wherein each of the second cavities 230 corresponds to one of the first cavities 210 and each of the first cavities 210 and each of the second cavities 230 are passed through by an opening (not shown).

Figure 2C:
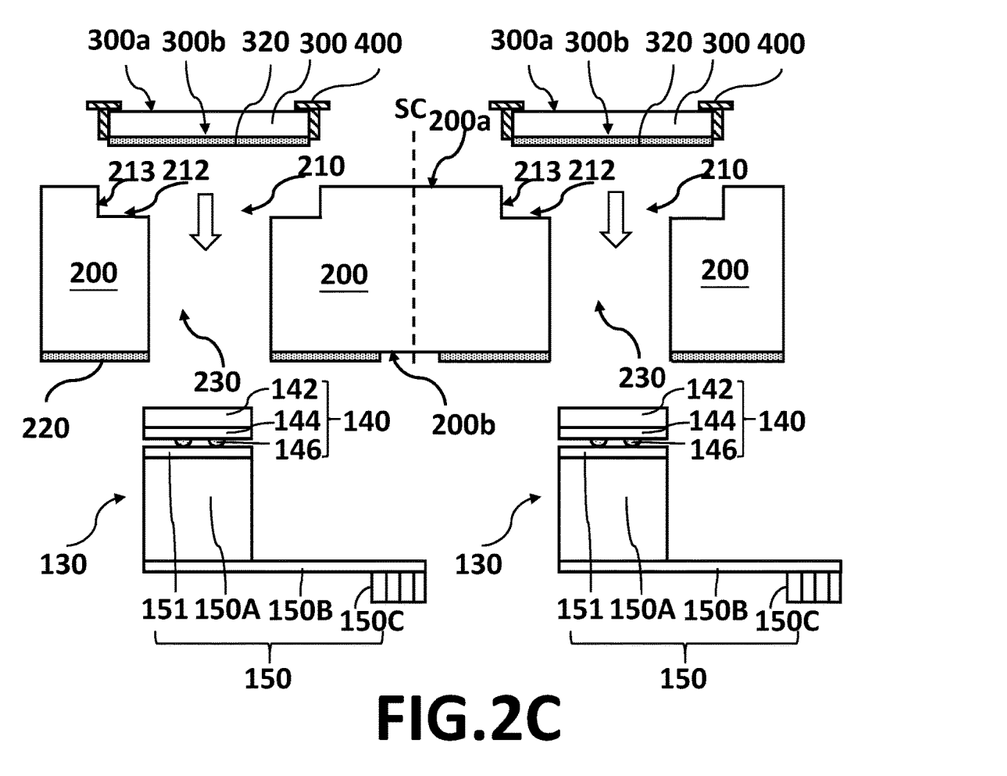

Next, please refer to FIG. 2C. A plurality of touch substrates 300 and a plurality of chip scale sensing chip package modules 130 are provided. Each touch substrates 300 comprises a third top surface 300a and a third bottom surface 300b having a second color layer formed thereon. Each touch substrates 300 is consisted of a material with higher hardness, such as glass, aluminum nitride, zirconia or sapphire. Each chip scale sensing chip package module 130 comprises a chip scale sensing chip package 140 electrically connected to a rigid-flexible print circuit board 150, wherein detailed structure of the chip scale sensing chip package 140 is illustrated in FIG. 3 and the embodiment 1.

Figure 2D:
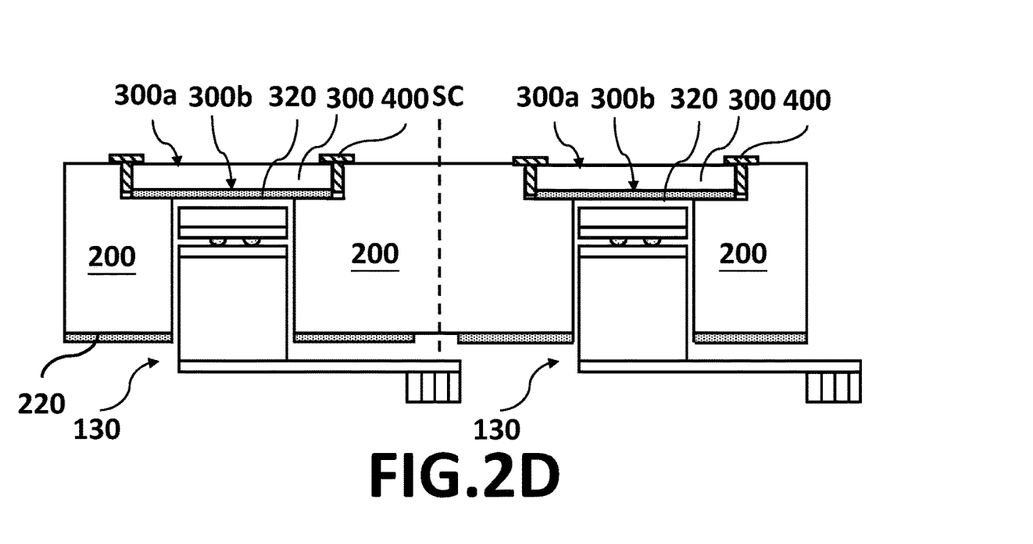

Next, please refer to FIG. 2D. Each touch substrates 300 is bonded to one of the bottom wall 212 of the first cavity 210 by part of the color layer 320, and each chip scale sensing chip package module 130 is placed in one of the second cavity 230 by bonding to the third bottom surface of each of the touch substrates 300 by sandwiching part of the second color layer 320 exposed by the opening (not shown) therebetween.

Figure 2E:
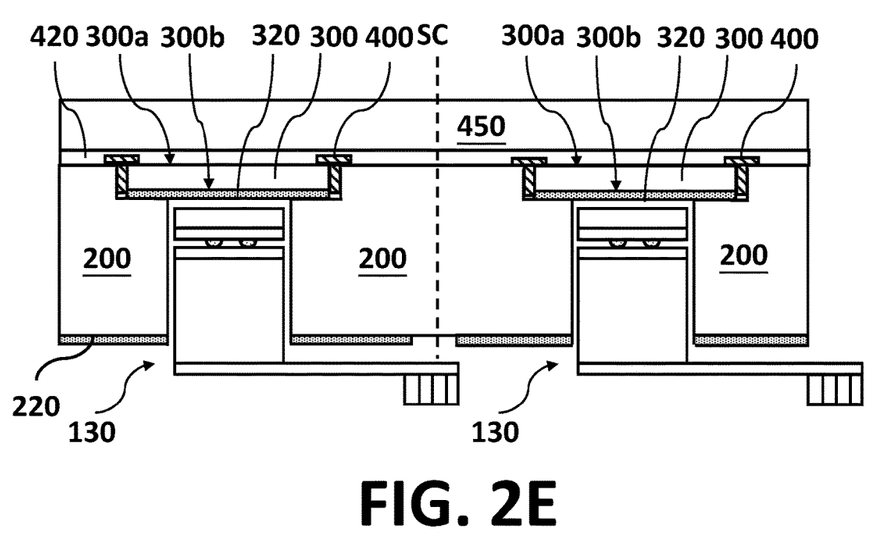

Next, please refer to FIG. 2E. A protective substrate 450 is capped on the first top surface 200a of the touch panel 200 and the third top surface 300a of the touch substrate 300. The protective substrate 450 is consisted of a material with higher hardness, such as glass or sapphire. The protective substrate 450 is bonded to the first top surface 200a of the touch panel 200 and the third top surface 300a of the touch substrate 300 by an adhesive layer 420.

Figure 2F:
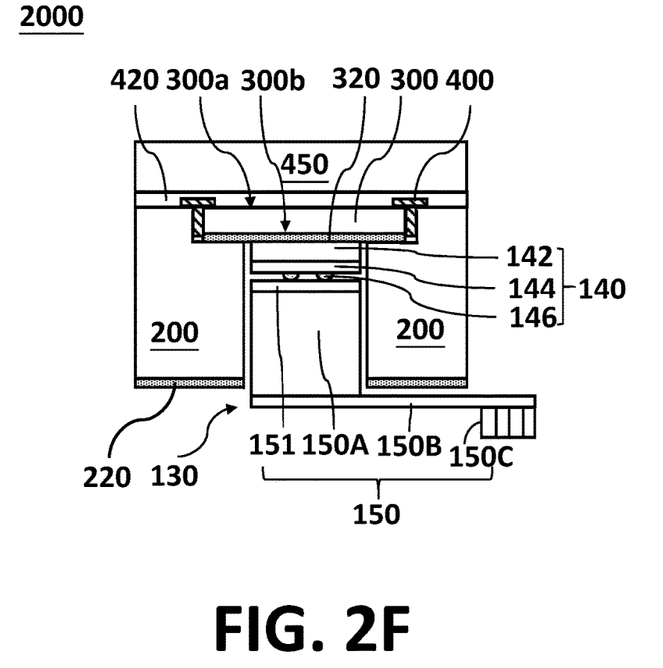

Finally, please refer to FIG. 2F. A scribing process is applied along the scribing channel (SC) to scribe the protective substrate 450, the adhesive layer 420 and the touch panel 200 to generate a plurality of independent touch panel-sensing chip package module complex 2000 as illustrated in FIG. 2F.

According to other embodiments of this invention, the structure as shown in FIG. 2D can also be cleaved into a plurality of independent temporary touch panel-sensing chip package chip package module complex (not shown) in advance, then a plurality of chip scale protective substrates 450 are provided, and each chip scale protective substrate 450 is respectively capped on the first top surface 200a of the touch panel 200 and the third top surface 300a of the touch substrate 300 of each temporary touch panel-sensing chip package chip package module complex (not shown) to generate a plurality of touch panel-sensing chip package chip package module complex 2000 as shown in FIG. 2F.

According to other embodiments of this invention, a plurality of metal holding rings 400 can be further provided to make each of the metal holding ring 400 surround between the edge of the touch substrate 300 and the sidewall 213 of the first cavity 210 to fasten the touch substrate 300 on the touch panel 200.

According to other embodiments of this invention, an adhesive layer (not shown) can be sandwiched between the color layer 120a and the chip scale sensing chip package module 130 to enhance the adhesion between color layer 120a and the chip scale sensing chip package module 130.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangement.

What is claimed is:

1. A touch panel-sensing chip package module complex, comprising:
    a touch panel with a first top surface and a first bottom surface opposite to each other, wherein the first bottom surface has a first cavity surrounded by a first sidewall;
    a first color layer on the first bottom surface adjacent to the first cavity;
    a second color layer exposed by the first cavity, wherein when viewed from above in a direction perpendicular to the first top surface of the touch panel, an outer edge of the first color layer surrounds the second color layer, and an inner edge of first color layer is overlapped by the second color layer; and
    a chip scale sensing chip package module placed in the first cavity by bonded to the second color layer, wherein the chip scale sensing chip package module comprises:
        a chip scale sensing chip package, comprising:
            a sensing chip with a second top surface and a second bottom surface opposite to each other, and the sensing chip comprising a sensing device and a plurality of conductive pads formed near the second top surface, and a conductive structure formed near the second bottom surface electrically connected to the conductive pads by a re-distribution layer; and
            a cap layer overlay on the second top surface of the sensing chip; and
        a circuit board formed under the chip scale sensing chip package and electrically connected to the chip scale sensing chip package by the conductive structure.

2. The touch panel-sensing chip package module complex as claimed in claim 1, wherein the sensing device is a biometric identification device.

3. The touch panel-sensing chip package module complex as claimed in claim 2, wherein the biometric identification device comprises a fingerprint identification device.

4. The touch panel-sensing chip package module complex as claimed in claim 1, wherein the conductive structure comprises solder balls, solder bumps or conductive pillars.

5. The touch panel-sensing chip package module complex as claimed in claim 1, wherein the circuit board is a rigid-flexible print circuit board.

6. The touch panel-sensing chip package module complex as claimed in claim 5, wherein the rigid-flexible print circuit board further comprises a connector.

7. The touch panel-sensing chip package module complex as claimed in claim 1, further comprising an adhesive layer sandwiched between the second color layer and the chip scale sensing chip package module.

8. The touch panel-sensing chip package module complex as claimed in claim 1, wherein the first top surface has a second cavity with a bottom wall surrounded by a second sidewall, and when viewed from above in the direction perpendicular to the first top surface of the touch panel, the cross-sectional area of the second cavity is greater than that of the first cavity, whereby the first cavity and the second cavity are passed through by an opening, wherein the touch panel-sensing chip package module complex further comprises:
    a touch substrate with a third top surface and a third bottom surface opposite to each other, whereby the touch substrate is bonded to the bottom wall of the second cavity, wherein the chip scale sensing chip package module is bonded to the third bottom surface, and the second color layer is between the third bottom surface and the chip scale sensing chip package module and between the bottom wall and the third bottom surface.

9. The touch panel-sensing chip package module complex as claimed in claim 8, wherein the sensing device is a biometric identification device.

10. The touch panel-sensing chip package module complex as claimed in claim 9, wherein the biometric identification device comprises a fingerprint identification device.

11. The touch panel-sensing chip package module complex as claimed in claim 8, wherein the conductive structure comprises solder balls, solder bumps or conductive pillars.

12. The touch panel-sensing chip package module complex as claimed in claim 8, wherein the circuit board is a rigid-flexible print circuit board.

13. The touch panel-sensing chip package module complex as claimed in claim 12, wherein the rigid-flexible print circuit board further comprises a connector.

14. The touch panel-sensing chip package module complex as claimed in claim 8, further comprising a metal holding ring surrounding between an edge of the touch substrate and the sidewall of the second cavity.

15. The touch panel-sensing chip package module complex as claimed in claim 8, further comprising a protective substrate capped on the first top surface of the touch panel and the third top surface of the touch substrate.

16. The touch panel-sensing chip package module complex as claimed in claim 8, further comprising an adhesive layer sandwiched between the second color layer and the chip scale sensing chip package module.

* * * * *